Patented June 6, 1950

2,510,869

UNITED STATES PATENT OFFICE 2,510,869

PREPARATION OF DIGUANYLPIPERAZINE AND SALTS THEREOF

John Joseph Denton, Bound Brook, and Hugh W. Stewart, Plainfield, N. J., assignors to American Cyanamid Company, New York, N. Y., a corporation of Maine No Drawing. Application March 18, 1948, Serial No. 15,738

5 Claims. (Cl. 260—268)

This invention relates to an improvement in the art of preparing 1,4-diguanylpiperazine and salts thereof.

Recently it has been shown that 1,4-diguanylpiperazine is an effective analgesic. It is important, therefore, that suitable methods of preparing this compound on a large scale be made available. The previously described methods of preparing 1,4-diguanylpiperazine are unsuited to commercial production because of the low yield resulting from the process and/or difficulties in separating the resulting product from the impurities of the reaction mixture.

One of the most successful prior attempts to prepare 1,4-diguanylpiperazine was made by Bischoff, Journal of Biological Chemistry, volume 80, page 345, 1928. Bischoff pointed out the fact that reactions involving cyanamide and amines, such as piperazine, were unusually complex because of the tendency of the cyanamide to polymerize to other products, such as dicyandiamide, and the tendency of such products to condense with the parent amine. He also noted the tendency of the product to react further with other substances in the reaction mixture. Several of these side reactions were discussed in some detail by Bischoff, who described conditions under which the side reactions were most apt to take place. As a result of these cosiderations, he attempted to prepare 1,4-diguanylpiperazine under four different conditions.

The most favorable reaction described by Bischoff was the reaction of piperazine dihydrochloride with anhydrous cyanamide in absolute alcohol under refluxing conditions. As a result of this process, he was able to obtain a yield of 1,4-diguanylpiperazine dihydrochloride of 22% of theory.

Piperazine hydrate was found to react with methylisothiourea sulfate in aqueous solutions, but pure 1,4-diguanylpiperazine sulfate could not be isolated. Bischoff also attempted to react piperazine hydrate with cyanamide in aqueous solution at lower temperatures, but after ten days he found that 40% of the cyanamide had dimerized and crystallized out as dicyandiamide and on concentration still more dicyandiamide was obtained. On the addition of alcohol to the residue unchanged piperazine hydrate was precipitated.

In contrast to these discouraging results we have discovered that 1,4-diguanylpiperazine can be obtained by a simple process in yields as high as 75%, and the reaction product can be recovered from the reaction mixture in a very pure form. Our process has a further advantage of using common industrial chemicals, does not require anhydrous working conditions or special solvents, may be conducted at atmospheric pressure and the reaction completed within a relatively short period of time.

1,4-diguanylpiperazine and its acid salts are prepared by us from aqueous solutions of cyanamide of commercial strength and an acid salt of piperazine. The aqueous cyanamide solution usually contains from about 23% to 25% cyanamide but may vary from 5% to 80% by weight of cyanamide. The piperazine may be used in the form of its dihydrochloride, sulfate, diacetate or one of its other acid salts.

The pH of the reaction mixture appears to be important. According to our process, the aqueous cyanamide and diguanylpiperazine dihydrochloride are mixed in any order, and the pH of the mixture is adjusted, if necessary, to within the range pH 1 to pH 6.5. Best results appear to be obtained when the pH of the starting mixture is within the range pH 3 to pH 6. As the reaction continues, the pH of the mixture rises so that at the end of the reaction the pH is usually about 7 but may be as high as about pH 10, depending, of course, upon the pH of the starting mixture, relative proportion of reactants, etc.

Good results are obtained by our new process at temperatures between 40° C. and 120° C., best results being obtained at refluxing temperature or within the range 90° C. to 110° C. The heating period will vary somewhat with the temperature and other conditions of the reactions, but in general, the reaction is completed in a shorter period of time at the higher temperatures. The reaction proceeds rapidly during the first few hours and then proceeds more slowly with time. In one particular run at reflux temperature a yield of 62% of theory was obtained in 5 hours, which after 10 hours had increased to 70%. Heating the reaction mixture unnecessarily long is to be avoided, as the product tends to hydrolyze and lower yields are obtained.

Superior results appear to be obtained when the reaction mixture contains an excess of cyanamide, for example, about 25% over the theoretical quantity required for the reaction.

After completion of the heating period the reaction mixture is acidified with a desired acid and cooled, whereupon the product separates from solution in the form of its acid salt. The product may then be separated, washed with water, dilute alcohol or alcohol, and dried. Washing with dilute alcohol or alcohol after separation facilitates rapid drying.

To illustrate the process in greater particularity the following examples are given. All parts are by weight unless otherwise indicated.

*Example 1*

To 758 parts of 24% aqueous cyanamide liquor there are added 287 parts of piperazine dihydrochloride. The reaction is heated while stirring at 90° C. for 15 hours. It is then made acidic to Congo red with 13 parts of concentrated hydrochloric acid. After cooling, the white crystals which separate are isolated by filtration, washed with cold water and dried at 50° C. The 1,4-diguanylpiperazine dihydrochoride may be crystallized from water. When pure, it begins to darken, depending upon the rate of heating, above 300° C. and melts with decomposition from 313° to 346° C.

*Example 2*

To 88.8 parts of a 23.7% aqueous cyanamide solution are added 36.8 parts of piperazine sulfate. The resulting solution is heated under reflux for seven hours, during which time a white solid separates. The slurry is then made acidic to Congo red paper with dilute sulfuric acid and chilled. The solid 1,4-diguanylpiperazine sulfate is collected on a filter, washed with dilute ethanol, and dried in an oven at 50° C. After drying, 27 parts are obtained.

*Example 3*

35.4 grams of piperazine dihydrochloride monohydrate is suspended in 20 grams of an aqueous solution containing 23.7% of cyanamide. The slurry is stirred and heated, during which time it changes to a paste and then to a solution. Upon reaching refluxing temperature, 117° C., there is then added slowly over a period of 1 hour and 15 minutes 69 grams of the aqueous cyanamide solution. Heating is continued for 6 hours more at reflux temperature, after which the reaction mixture is made acidic to Congo red with concentrated hydrochloric acid and cooled. The product which crystallizes out is collected on a filter, washed with 50% alcohol, and dried at 50° C. There is obtained 32.1 grams of 1,4-diguanylpiperazine dihydrochloride, a yield of 66% of theory.

We claim:

1. A method of preparing 1,4-diguanylpiperazine which comprises the steps of mixing together an aqueous solution of cyanamide and an acid salt of piperazine and heating the reaction mixture in a solvent consisting essentially of water within the range 40° C. to 120° C. until 1,4-diguanylpiperazine is obtained.

2. A method of preparing 1,4-diguanylpiperazine which comprises the steps of mixing together an aqueous solution of cyanamide and an acid salt of piperazine at a hydrogen ion concentration within the range pH 1 to pH 6.5 and heating the reaction mixture in a solvent consisting essentially of water at a temperature within the range 90° C. to 110° C. until 1,4-diguanylpiperazine has been obtained.

3. A method of preparing 1,4-diguanylpiperazine which comprises the steps of mixing together an aqueous solution of cyanamide and piperazine dihydrochloride at a hydrogen ion concentration within the range pH 1 to pH 6.5 and heating the reaction mixture in a solvent consisting essentially of water at a temperature within the range 90° C. to 110° C. until 1,4-diguanylpiperazine has been obtained.

4. A method of preparing acid salts of 1,4-diguanylpiperazine which comprises the steps of mixing together at an initial pH within the range pH 3 to pH 6 an acid salt of piperazine and an aqueous solution containing from about 5% to 80% by weight of cyanamide, heating the mixture in a solvent consisting essentially of water at a temperature within the range 90° C. to 110° C. until diguanylpiperazine has been formed, acidifying the reaction mixture with an acid and recovering therefrom the corresponding acid salt of 1,4-diguanylpiperazine.

5. A method of preparing 1,4-diguanylpiperazine which comprises the steps of mixing together piperazine hydrochloride in an aqueous solution containing from about 20% to 25% by weight of cyanamide and heating the reaction mixture in a solvent consisting essentially of water at a temperature within the range 90° C. to 110° C. until 1,4-diguanylpiperazine has been formed.

JOHN JOSEPH DENTON.
HUGH W. STEWART.

REFERENCES CITED

The following references are of record in the file of this patent:

FOREIGN PATENTS

| Number | Country | Date |
|---|---|---|
| 316,195 | Great Britain | July 24, 1928 |

OTHER REFERENCES

Williams, The Chemistry of Cyanogen Compounds, J. & A. Churchill, London (1915), pp. 17 and 18.

Bischoff, J. Biol. Chem., 80, 345–355 (1928).